United States Patent [19]
Tokar et al.

[11] Patent Number: 5,871,048
[45] Date of Patent: Feb. 16, 1999

[54] DETERMINING AN OPTIMUM GAS INJECTION RATE FOR A GAS-LIFT WELL

[75] Inventors: Timothy J. Tokar, The Woodlands, Tex.; Brian E. Smith, Mandeville, La.

[73] Assignee: Chevron U.S.A. Inc., San Francisco, Calif.

[21] Appl. No.: 824,606

[22] Filed: Mar. 26, 1997

[51] Int. Cl.[6] .................................................. E21B 43/00
[52] U.S. Cl. ........................... 166/263; 166/53; 166/64; 166/370; 166/372; 137/155; 417/113
[58] Field of Search ................... 166/53, 64, 250.01, 166/263, 370, 372; 137/155; 417/113

[56] References Cited

U.S. PATENT DOCUMENTS

| | | |
|---|---|---|
| 3,646,953 | 3/1972 | Elliott et al. . |
| 3,834,414 | 9/1974 | McMurry . |
| 4,111,608 | 9/1978 | Elliott et al. ............................. 417/112 |
| 4,267,885 | 5/1981 | Sanderford .......................... 166/372 X |
| 4,442,710 | 4/1984 | Meng . |
| 4,633,954 | 1/1987 | Dixon et al. ............................. 166/372 |
| 4,738,313 | 4/1988 | McKee ..................................... 166/372 |
| 5,033,550 | 7/1991 | Johnson et al. ......................... 166/372 |

OTHER PUBLICATIONS

Kanu, E. P., et. al., "Economic Approach to Oil Production and Gas Allocation in Continuous Gas Lift", Journal of Petroleum Technology, Oct. 1981, p. 1887.

Clegg, J. D., "Discussion of Economic Approach to Oil Production and Gas Allocation in Continuous Gas Lift", Journal of Petroleum Technology, Feb. 1982, p. 301.

Coltharp, E. D., et. al., "Dubai Gas Lift Automation", SPE 13203, 59th Annual Technical Conference, Houston, TX, U.S.A., Sep. 1984, p. 1.

Zheng–Gang, X., et al., "Economical Distribution of Gas in a Continuous Gas–Lift System Subject to Variable Cost and System Constraint", Petroleum Society of CIM, 39th Annual Technical Meeting, Calgary, Alberta, Canada, Jun. 1988, p. 27–1.

Edwards R., et al., "A Gas–Lift Optimization and Allocation Model for Manifold Subsea Wells", SPE 20979, Europec 90, The Hague, Netherlands, Oct. 1990, p. 535.

*Primary Examiner*—Roger Schoeppel
*Attorney, Agent, or Firm*—Rodney F. Brown

[57] ABSTRACT

A method is provided for automatically determining an optimum gas injection rate for a gas-lifted oil well. The optimum gas-lift slope for the oil well is initially provided and stored in the memory of a programmable logic controller. A lift gas is injected into the well at an initial gas injection rate to displace a liquid at an initial liquid production rate from the well. The initial liquid production rate and initial gas injection rate are stored in the memory. Thereafter, the lift gas is injected into the well at a first incremental gas injection rate differing from the initial gas injection rate by a first incremental value. Additional liquid is displaced from the well at a first incremental liquid production rate and the first incremental liquid production rate and first incremental gas injection rate are stored in the memory. The first incremental slope is determined from the stored data points and compared to the optimum gas-lift slope. The procedure is repeated for a second incremental gas injection rate, wherein the second incremental value is selected as either positive or negative in response to the comparison of the first incremental slope and the optimum gas-lift slope. The second incremental slope is determined from the stored data points and compared to the optimum gas-lift slope. In response to this comparison, the first incremental gas injection rate is determined to be the optimum gas injection rate or the above-recited procedure is repeated for a third incremental gas injection rate and additional incremental gas injection rates, if necessary, until an incremental gas injection rate is determined to be the optimum gas injection rate.

27 Claims, 5 Drawing Sheets

DETERMINING AN OPTIMUM GAS INJECTION RATE FOR A GAS-LIFT WELL

BACKGROUND OF THE INVENTION

1. Technical Field

The present invention relates generally to the production of oil from a subterranean oil-bearing formation and, more particularly, to a method for determining an optimum gas injection rate for a gas-lifted oil well penetrating the formation.

2. Background Information

Gas injection into an oil well is a well-known artificial lift method that facilitates oil recovery from the well. A typical gas lift method provides a lift gas at the surface that is conveyed through a gas flow control valve to a surface wellhead connection where the lift gas is injected into the casing-tubing annulus of the well. The adjustable position of the gas flow control valve regulates the gas injection rate into the well. Upon injection, the lift gas travels down the casing-tubing annulus to a plurality of specially designed subsurface gas injection valves that enable the lift gas to enter the tubing string. The lift gas commingles with the reservoir fluids in the tubing string, lifting the reservoir fluids up the tubing string to the surface for the recovery of oil therefrom. The injection rate of the lift gas into the well is an important parameter for the economics of the well because there are significant operational costs associated with gas injection. Accordingly, it is desirable to economically optimize the gas injection rate into the well such that the operational costs for the well are balanced with the oil production revenue from the well.

The concept of slope is associated with the optimum gas injection rate for a gas-lifted oil well, wherein the gas-lift slope is defined as the incremental change in the liquid production rate divided by the incremental change in the gas injection rate for the well at any point on a plot of the gas injection rate versus the liquid production rate. Such plots are theoretically developed from published empirical correlations. The theoretical optimum gas injection rate for a gas-lifted oil well generally corresponds to the optimum gas-lift slope which can be derived from conventional equations known in the prior art. Thus, it is possible to mathematically determine the theoretical optimum gas injection rate for a gas-lifted oil well using empirical correlations. However, the actual or field-measured optimum gas injection rate for a gas-lifted oil well must be determined in the field by direct testing of the oil well for liquid productions rates at various gas injection rates. An ongoing need exists for improved means of determining the actual optimum gas injection rate for a gas-lifted oil well.

Accordingly, it is an object of the present invention to provide an effective method for determining the actual optimum gas injection rate for a gas-lifted oil well. It is also an object of the present invention to provide such a method that determines the actual optimum gas injection rate automatically once the method is initiated. It is another object of the present invention to provide such a method that determines the actual optimum gas injection rate from measured field data including liquid production rates and gas injection rates, rather than empirical correlations. It is still another object of the present invention to provide such a method that determines the actual optimum gas injection rate by automatically and iteratively adjusting the actual gas injection rate into the well at the surface via a gas flow control valve. It is a further object of the present invention to provide such a method that continuously injects a lift gas into the gas-lifted oil well at the optimum gas injection rate for continuous oil production upon completion of the method by automatically fixing the position of the surface gas flow control valve. It is a further object of the present invention to provide such a method the optimum gas injection rate is based on economic criteria. These objects and others are achieved in accordance with the invention described hereafter.

SUMMARY OF THE INVENTION

The present invention is a method for automatically determining an optimum gas injection rate for a gas-lifted oil well penetrating a subterranean oil-bearing formation, injecting a lift gas into the well at the optimum gas injection rate and producing oil from the well in response to the injected lift gas. The method utilizes a plurality of operating components associated with the gas-lifted oil well including a gas flow control valve and a programmable logic controller electronically linked with the gas flow control valve. The optimum gas-lift slope for the oil well is initially provided and stored in the memory of the programmable logic controller. The optimum gas-lift slope can, for example, be an economic optimum gas-lift slope calculated from a plurality of predetermined economic data including well production revenue data and well operating cost data.

The programmable logic controller initially sets the gas flow control valve at an initial position in response to instructions inputted to the programmable logic controller by an operator. The gas flow control valve enables injection of a lift gas into the well at an initial gas injection rate correlated to the initial position of the valve. The gas flow control valve is maintained at the initial position for an initial stabilizing time period that is sufficient to stabilize production from the well at an initial steady state. After the initial stabilizing time period, an initial volume of liquid, generally oil or oil and water, is displaced from the well during a predetermined initial steady-state time period stored in the memory, while maintaining the initial gas injection rate into the well via the gas flow control valve. The initial volume of liquid is measured with a liquid flow meter to determine the initial liquid production rate from the well. The initial liquid production rate and initial gas injection rate are stored in the memory.

Upon completion of the initial steady-state time period, the programmable logic controller automatically resets the gas flow control valve at a first incremental position differing from the initial position in response to predetermined instructions stored in the memory and communicated to the valve by the programmable logic controller. The gas flow control valve enables injection of the lift gas into the well at a first incremental gas injection rate correlated to the first incremental position of the valve and differing from the initial gas injection rate by a predetermined first incremental value stored in the memory. The gas flow control valve is maintained at the first incremental position for a first incremental stabilizing time period that is sufficient to restabilize production from the well at a first incremental steady state. After the first incremental stabilizing time period, a first incremental volume of liquid is displaced from the well during a predetermined first incremental steady-state time period stored in the memory that is preferably equal to the initial steady-state time period, while maintaining the first incremental gas injection rate into the well via the gas flow control valve. The first incremental volume of liquid is measured with the liquid flow meter to determine the first incremental liquid production rate from the well. The first incremental liquid production rate and first incremental gas injection rate are stored in the memory.

The programmable logic controller determines the first incremental slope from the stored data points for the initial liquid production rate, first incremental liquid production rate, initial gas injection rate, and first incremental gas injection rate. The programmable logic controller compares the first incremental slope to the optimum gas-lift slope for the well stored in the memory.

The programmable logic controller automatically resets the gas flow control valve at a second incremental position differing from the first incremental position and the lift gas is injected into the well at a second incremental gas injection rate correlated to the second incremental position of the valve. The second incremental gas injection rate differs from the first incremental gas injection rate by a predetermined second incremental value stored in the memory, the absolute value of which is preferably equal to the absolute value of the first incremental value. The second incremental value is selected as either positive or negative in response to the comparison of the first incremental slope and the optimum gas-lift slope.

Production from the well is restabilized at a second incremental steady state in a second incremental stabilizing time period. A second incremental volume of liquid is displaced from the well during a predetermined second incremental steady-state time period stored in the memory that is preferably equal to the initial steady-state time period. The second incremental volume of liquid is measured to determine the second incremental liquid production rate from the well. The second incremental liquid production rate and the second incremental gas injection rate are stored in the memory. The programmable logic controller determines the second incremental slope from the stored data points for the first incremental liquid production rate, second incremental liquid production rate, first incremental gas injection rate, and second incremental gas injection rate. The programmable logic controller compares the second incremental slope to the optimum gas-lift slope for the well stored in the memory. In response to the comparison of the second incremental slope and the optimum gas-lift slope, the first incremental gas injection rate is determined to be the optimum gas injection rate or the above-recited procedure is repeated for a third incremental gas injection rate and additional incremental gas injection rates, if necessary, until an incremental gas injection rate is determined to be the optimum gas injection rate.

In a preferred embodiment, the first incremental value, whereby the first incremental gas injection rate differs from the initial gas injection rate, is selected to be positive. The second incremental value, whereby the second incremental gas injection rate differs from the first incremental gas injection rate, is selected to be positive, if the first incremental slope is greater than or equal to the optimum gas-lift slope, and is selected to be negative, if the first incremental slope is less than the optimum gas-lift slope. The first incremental gas injection rate is determined to be the optimum gas injection rate, if the second incremental slope is less than the optimum gas-lift slope and the second incremental value is positive, or if the second incremental slope is greater than or equal to the optimum gas-lift slope and the second incremental value is negative. The procedure is repeated for a third incremental gas injection rate, if the second incremental slope is greater than or equal to the optimum gas-lift slope and the second incremental value is positive, or if the second incremental slope is less than the optimum gas-lift slope and the second incremental value is negative.

In an alternate embodiment, the first incremental value, whereby the first incremental gas injection rate differs from the initial gas injection rate, is selected to be negative and the methods proceeds in substantially the same manner as described above.

Once the optimum gas-lift slope is determined, the programmable logic controller automatically sets and maintains the gas flow control valve at the corresponding incremental position, injecting the lift gas into the well at the incremental gas injection rate which corresponds to the optimum gas injection rate and producing oil from the well in response to the injected lift gas. Operation of the programmable logic controller may then automatically terminate and practice of the method is effectively completed.

The invention will be further understood from the accompanying drawings and description.

DESCRIPTION OF PREFERRED EMBODIMENTS

Figure 1:
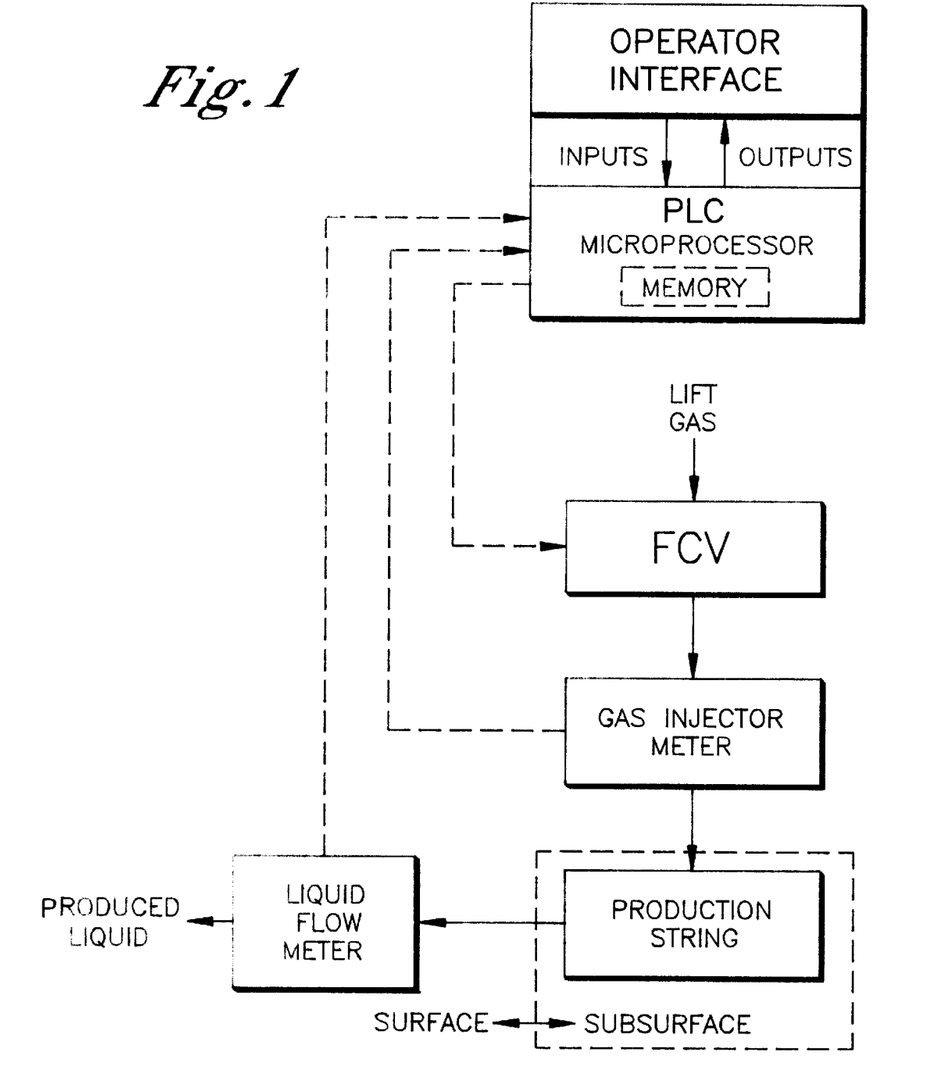
FIG. 1 is a schematic block diagram of the operating components employed in accordance with the method of the present invention.
Figure 2A:
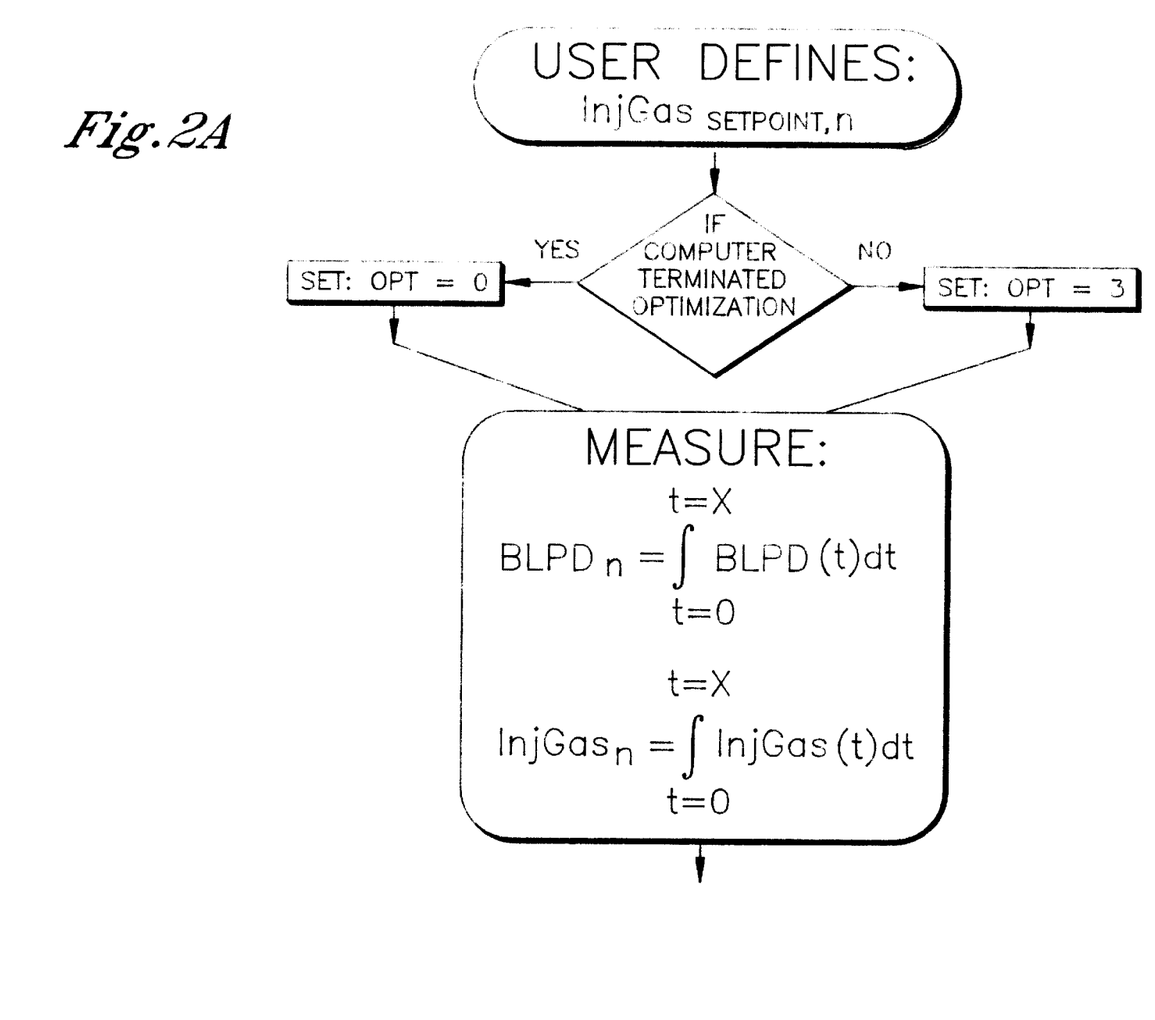
FIGS. 2A–D are schematic logic flow charts of the optimization routine employed in accordance with the method of the present invention.
Figure 2B:
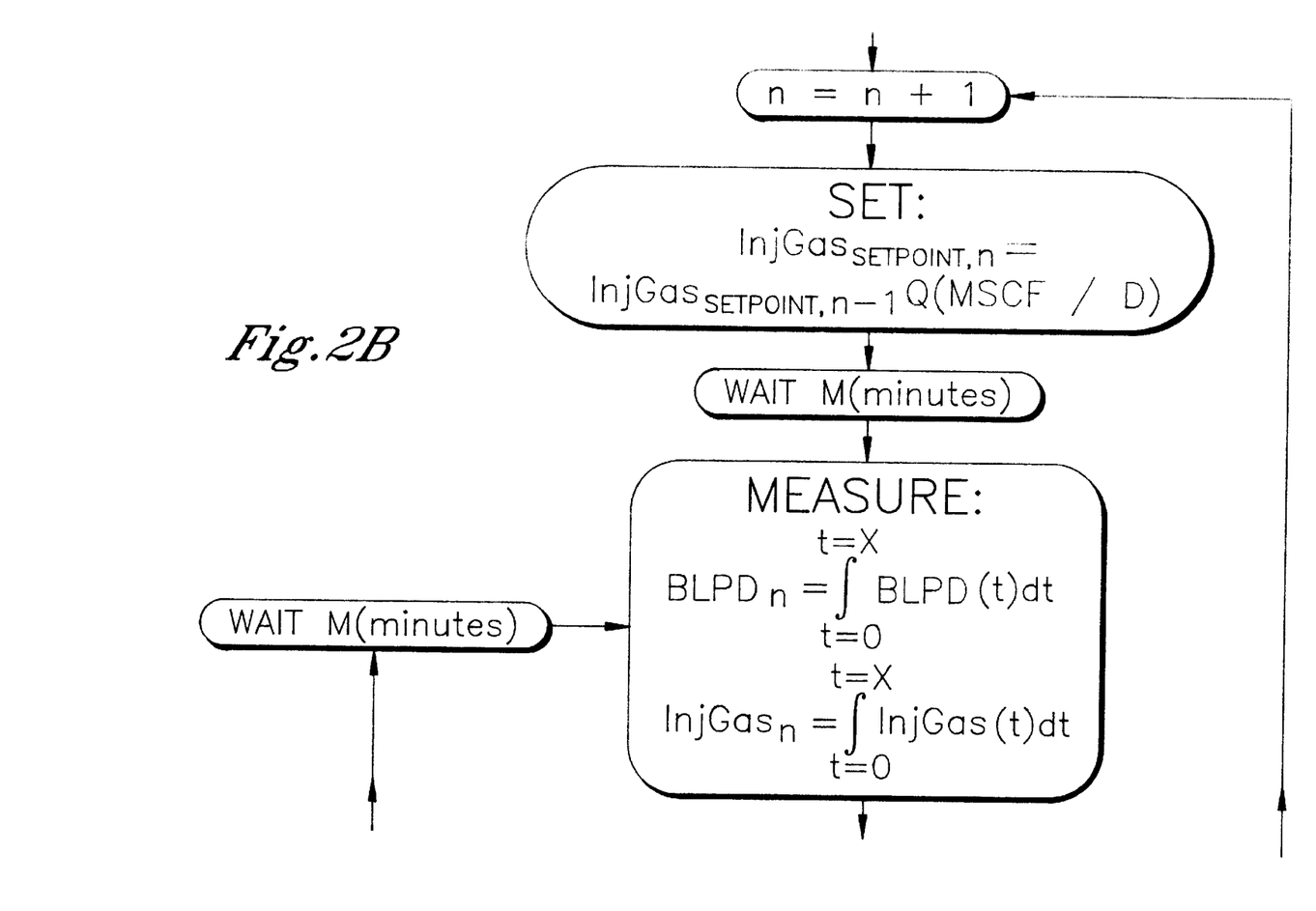
Figure 2C:
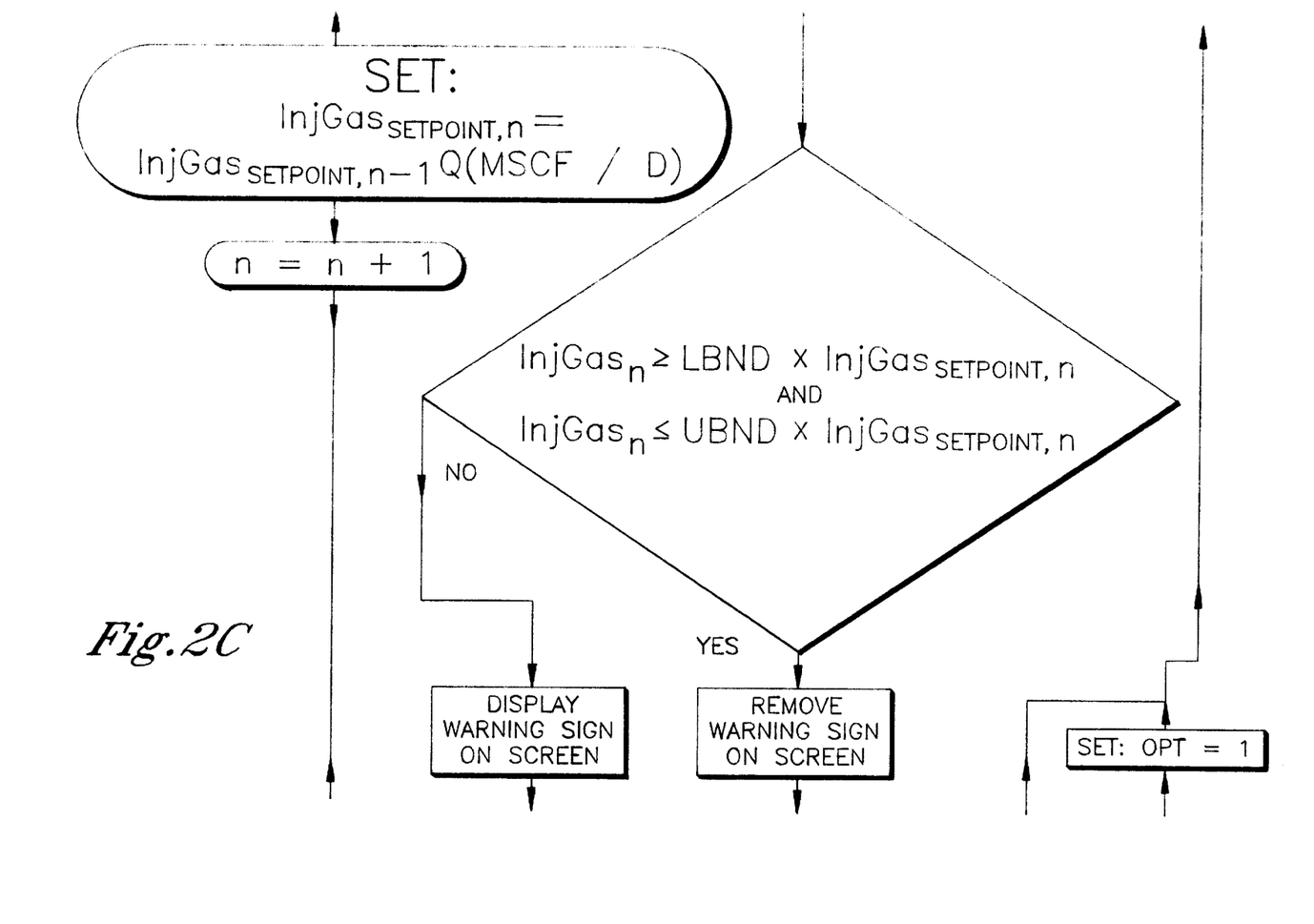
Figure 2D:
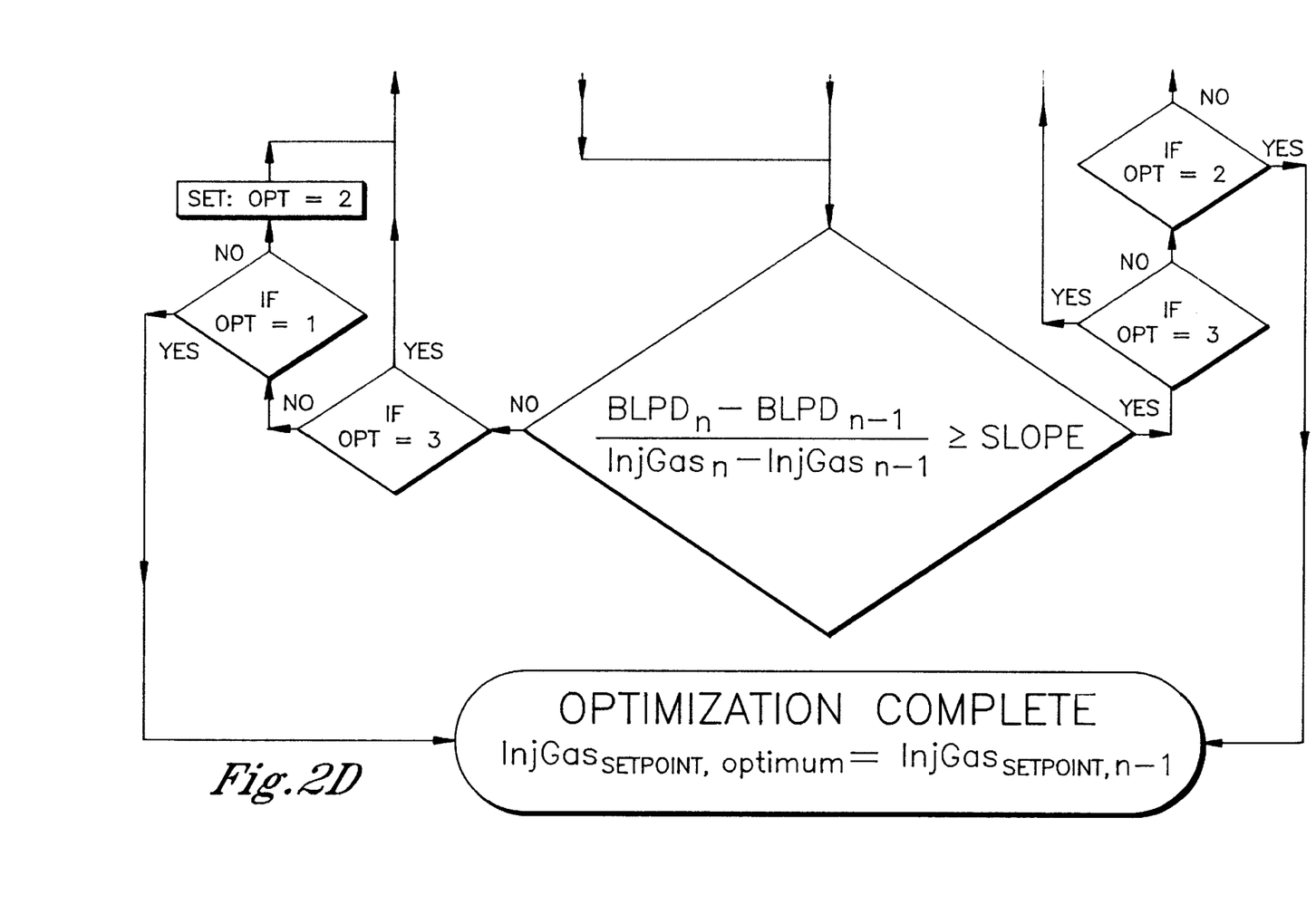

Referring initially to FIG. 1, the surface operating components employed in accordance with the method of the present invention are shown to include a programmable logic controller (PLC), a gas flow control valve (FCV), a gas injection meter and a liquid flow meter. The FCV and gas injection meter are conventional devices used in association with a gas-lifted oil well for controlled injection of a lift gas into the well. The liquid flow meter is a conventional device for measuring liquids including oil, water and basic sediments produced from the gas-lifted oil well. The PLC comprises a microprocessor having a memory, inputs, outputs, and an operator interface. The operator interface may include conventional components such as a keyboard, a display monitor or a printer. The inputs, outputs and operator interface enable operator interaction with the PLC as described hereafter. The PLC is electronically linked to the FCV, gas injection meter and liquid flow meter, as shown by the dashed arrows, enabling the PLC to receive liquid production feedback signals and gas injection feedback signals from the liquid flow meter and gas injection meter, respectively, and enabling the PLC to transmit operating instruction signals to the FCV.

For purposes of illustration, the present invention is described hereafter as a method for optimizing the gas injection rate for a gas-lifted oil well based on economic criteria. However, it is understood by the skilled artisan from the present teaching that the method can be readily adapted to optimize the gas injection rate for the gas-lifted oil well based on other criteria, such as the liquid production rate, within the scope of the present invention. It is noted that the term "liquid production" as used herein may refer either to the total production of all liquids from the well or the individual production of a single liquid component, such as oil or water, from the well, as will be apparent from the context. It is understood by the skilled artisan that the present method can be practiced using the production of all liquids as a basis or, alternatively, using the production of a single liquid component, such as oil, as the basis, if the fraction of the liquid component is known.

Referring to FIGS. 2A–D, the method of the present invention is initiated by inputting the economic optimum gas-lift slope, designated "SLOPE", for the oil well of interest into the PLC memory. The gas-lift slope for the oil well represents the incremental change in the liquid production rate from the well divided by the incremental change in the gas injection rate into the well. The economic optimum gas-lift slope corresponds to the minimum positive value of the gas-lift slope for the oil well. The economic optimum gas-lift slope is preferably obtained using an economic optimum gas-lift slope equation developed from a series of interrelations between economic variables relating to the operating expenses and production revenues of the oil well. Relevant variables are defined below:

$$\text{Incremental Oil Revenue} = \left( \Delta BOPD \times \frac{\$Rev_{Oil}}{BBL_{Oil}} \right)$$

$$\text{Incremental Gas Revenue} = \left( \Delta BOPD \times GOR \times \frac{\$Rev_{Gas}}{MSCF_{product}} \right)$$

$$\text{Compressor Expense} = \left( \Delta MSCFID_{injection} \times \frac{\$Expns_{Compressor}}{MSCF_{injection}} \right)$$

$$\text{Liquids Treating Expense} = \left( \Delta BLPD \times \frac{\$Expns_{LiqTrt}}{BBL_{Liq}} \right)$$

Potential Revenue from Fuel Gas =

$$\left( \Delta MSCFID_{injection} \times \frac{0.032\ MSCF_{fuel}}{MSCF_{injection}} \times \frac{\$Rev_{gas}}{MSCF_{fuel}} \right)$$

Potential Revenue from Replacement Injection Gas =

$$\left( \Delta BLPD \times \frac{\$Expns_{LiqTrt}}{BBL_{Liq}} \right) =$$

$$\left( \Delta MSCFID_{injection} \times \frac{0.032\ MSCF_{fuel}}{MSCF_{injection}} \times \frac{\$Rev_{gas}}{MSCF_{fuel}} \right) +$$

$$\left( RF \times \Delta MSCFID_{injection} \times \frac{\$Rev_{gas}}{MSCF_{injection}} \right)$$

The variable RF is defined as the Replacement Factor, wherein $0 \leq RF \leq 1$. In a perfectly closed gas lift system, RF=0. The lift gas is injected into the well, produced with the lifted fluids, recovered and recompressed in its entirety for reinjection into the well. There is no potential revenue from the lift gas since it is continuously recycled in its entirety to the well. In a more realistic system, however, it is assumed that some of the lift gas must be replaced from time to time due to losses in the system. Thus, RF is slightly greater than 0 for a typical closed system having minor losses of lift gas.

The definition of the gas-lift slope at any given time is stated in terms of Equation 2:

$$\text{slope} = \frac{\Delta BOPD}{\Delta MSCFID_{injection}} \tag{2}$$

In Equations 3–5 below, the variable BSandW is defined as the fraction of basic sediments and water relative to total liquids produced from the well on a volume basis:

$$\Delta BLPD = \frac{\Delta BOPD}{1 - BSandW} \tag{3}$$

$$\Delta BOPD \left[ \left( \frac{\$Rev_{Oil}}{BBL_{Oil}} \right) + \left( GOR \times \frac{\$Rev_{gas}}{MSCF_{product}} \right) - \left( \frac{1}{1-BSandW} \times \frac{\$Expns_{LiqTrt}}{BBL_{Liq}} \right) \right] = \tag{4}$$

$$\Delta MSCFID_{injection} \left[ \left( \frac{0.032\ MSCF_{fuel}}{MSCF_{injection}} \times \frac{\$Rev_{gas}}{MSCF_{fuel}} \right) + \left( RF \times \frac{\$Rev_{gas}}{MSCF_{injection}} \right) + \left( \frac{\$Expns_{Compressor}}{MSCF_{injection}} \right) \right]$$

$$\text{SLOPE} = \left( \frac{\Delta BOPD}{\Delta MSCFID_{injection}} \right)_{Optimum} = \frac{\left( \frac{0.032\ MSCF_{fuel}}{MSCF_{injection}} \times \frac{\$Rev_{gas}}{MSCF_{fuel}} \right) + \left( RF \times \frac{\$Rev_{gas}}{MSCF_{injection}} \right) + \left( \frac{\$Expns_{Compressor}}{MSCF_{injection}} \right)}{\left( \frac{\$Rev_{Oil}}{BBL_{Oil}} \right) + \left( GOR \times \frac{\$Rev_{gas}}{MSCF_{product}} \right) - \left( \frac{1}{1-BSandW} \times \frac{\$Expns_{LiqTrt}}{BBL_{Liq}} \right)} \tag{5}$$

-continued $$\left( RF \times \Delta MSCFID_{injection} \times \frac{\$Rev_{gas}}{MSCF_{injection}} \right)$$

The economic optimum gas-lift slope equation is stated below as Equation 5 derived from Equations 1–4 in the following manner. It is initially noted that the optimum gas injection rate for the gas-lifted oil well occurs when (Incremental Oil Revenue)+(Incremental Gas Revenue)−(Compressor Expense)−(Liquid Treating Expense)= (Potential Revenue from Fuel Gas if sold)+(Potential Revenue from Replacement Lift Gas if sold). This relationship is restated in terms of Equation 1:

$$\left( \Delta BOPD \times \frac{\$Rev_{Oil}}{BBL_{Oil}} \right) + \left( \Delta BOPD \times GOR \times \frac{\$Rev_{Gas}}{MSCF_{product}} \right) - \tag{1}$$

$$\left( \Delta MSCFID_{injection} \times \frac{\$Expns_{Compressor}}{MSCF_{injection}} \right) \times$$

The economic optimum gas-lift slope can be obtained independent of the PLC and inputted by the operator into the PLC memory via the operator interface or, alternatively, the PLC can be used calculate the economic optimum gas-lift slope if the economic optimum gas-lift slope equation is inputted into the PLC and the operator inputs the predetermined numerical values for the economic variables into the PLC via the operator interface.

In any case, once the optimum gas-lift slope for the gas-lifted oil well is inputted and stored in the memory of the PLC, the operator selects a setpoint value for the initial gas injection rate $InjGas_{setpoint,n}$ and enters the setpoint value into the PLC via the operator interface. The operator also selects one of two operating mode options for the PLC, OPT=0 or OPT=3, wherein the operating mode options are defined below:

OPT=0 Initial operating mode for automatic termination of the optimization routine by the PLC, enables OPT=1 or OPT=2.

OPT=1 Operating mode automatically enabled after OPT=0, if $\text{slope}_n \geq \text{SLOPE}$, optimization routine continues, if slope$_n$<SLOPE, automatically initiates termination subroutine.

OPT=2 Operating mode automatically enabled after OPT=0, if slope$_n$<SLOPE, optimization routine continues, if slope$_n$≧SLOPE, automatically initiates termination subroutine.

OPT=3 Operating mode for manual termination only of the optimization routine by the operator.

If OPT=0 is selected, no further operator input is required. Under OPT=0, the optimization routine shown in FIGS. 2A–D proceeds and terminates automatically under the direction of the PLC having the optimization routine programmed therein. The operator, however, is able to monitor the progress of the routine by means of the operator interface if desired. If OPT=3 is selected, the optimization routine proceeds and terminates only at the manual direction of the operator. The optimization routine is described hereafter with reference to practice of the automatically terminating operating mode OPT=0, and subsequently OPT=1 and OPT=2. Nevertheless, practice of the manually terminating operating mode OPT=3 is readily apparent to the skilled artisan from the following description and reference to FIGS. 2A–D.

In accordance with OPT=0, the PLC sets the FCV at an initial position that corresponds to the desired initial gas injection rate InjGas$_{setpoint,n}$, wherein n=0. The FCV is maintained at the initial position for an initial stabilizing time period M sufficient to stabilize production of liquid from the well at an initial steady state. Production is continued from the well after time M for a predetermined initial steady-state time period x stored in the memory of the PLC, while maintaining the FCV set at the initial position and injecting the lift gas into the well. The gas injection meter measures the actual initial injection rate of the lift gas InjGas$_n$ from the FCV through the gas injection meter into the well and transmits the rate measurements to the PLC as feedback. The PLC compares the actual initial gas injection rate InjGas$_n$ and the desired initial gas injection rate InjGas$_{setpoint,n}$ to insure that the actual initial gas injection rate InjGas$_n$ closely approximates the desired initial gas injection rate InjGas$_{setpoint,n}$ within a predetermined upper bound UBND and a predetermined lower bound LBND above and below the desired initial gas injection rate InjGas$_{setpoint,n}$, respectively.

An initial volume of liquid, typically comprising oil and water, is displaced from the well during time x while the lift gas is continuously injected into the well at the actual initial gas injection rate InjGas$_n$. The liquid is conveyed to the liquid flow meter where the relative volume of each liquid component, and correspondingly the initial liquid production rate BLPD$_n$, i.e., (BOPD$_n$+BWPD$_n$), is measured and transmitted to the PLC as feedback. The rates BLPD$_n$, InjGas$_n$ and InjGas$_{setpoint,n}$ are stored in the PLC memory.

At the end of time x the PLC automatically transmits an instruction signal to the FCV in response to predetermined instructions stored in the PLC memory. In accordance with the instruction signal, the FCV resets at a first incremental position differing from the initial position of the FCV. The first incremental position corresponds to a new setpoint value for a desired first incremental gas injection rate InjGas$_{setpoint,n}$, where n=n+1=1. Accordingly, the desired initial gas injection rate is restated as InjGas$_{setpoint,n-1}$, where n=n-1=0. The desired first incremental gas injection rate InjGas$_{setpoint,n}$ is increased from the desired initial gas injection rate InjGas$_{setpoint,n-1}$ by a value Q such that:

$$InjGas_{setpoint,n}=InjGas_{setpoint,n-1}+Q.$$

The FCV is maintained at the first incremental position for a first incremental stabilizing time period M sufficient to stabilize production of liquid from the well at a first incremental steady state. The initial and first incremental stabilizing periods M are preferably equal to one another. Production is continued from the well after period M for a predetermined first incremental steady-state time period x, while maintaining the FCV set at the first incremental position and injecting the lift gas into the well. The initial and first incremental steady-state time periods x are preferably equal to one another. The gas injection meter measures the actual first incremental gas injection rate of the lift gas InjGas$_n$ from the FCV into the well and transmits the actual first incremental gas injection rate measurements to the PLC as feedback. The PLC compares the actual first incremental gas injection rate InjGas$_n$ and the desired first incremental gas injection rate InjGas$_{setpoint,n}$ to insure that the actual first incremental gas injection rate InjGas$_n$ closely approximates the desired first incremental gas injection rate InjGas$_{setpoint,n}$ within bounds UBND and LBND.

A first incremental volume of liquid is displaced from the well during time x while the lift gas is continuously injected into the well at the actual first incremental gas injection rate InjGas$_n$. The liquid is conveyed to the liquid flow meter where the relative volume of liquid of each liquid component, and correspondingly the first incremental liquid production rate BLPD$_n$, i.e., (BOPD$_n$+BWPD$_n$), is measured and transmitted to the PLC as feedback. The rates BLPD$_n$, InjGas$_n$ and InjGas$_{setpoint,n}$ are stored in the PLC memory.

At the end of time x, the PLC determines a measured gas-lift slope of the incremental liquid production rate change versus the incremental gas injection rate change for the well from the values of BLPD$_n$, BLPD$_{n-1}$, InjGas$_n$, and InjGas$_{n-1}$ stored in the PLC memory. This measured gas-lift slope is termed the first incremental slope, slope$_n$, wherein:

$$slope_n = \frac{(BLPD_n - BLPD_{n-1})}{(InjGas_n - InjGas_{n-1})}$$

The PLC compares the first incremental slope$_n$ for the well to the calculated economic optimum gas-lift slope (SLOPE) stored in the PLC memory. The PLC automatically resets to the operating mode OPT=1 or OPT=2 in response to the relation between the first incremental slope$_n$ and the SLOPE and transmits an instruction signal to the FCV corresponding to the operating mode of the PLC. In accordance with the instruction signal, the FCV resets at a second incremental position differing from the first incremental position of the FCV. The second incremental position corresponds to a new setpoint value for a second incremental gas injection rate InjGas$_{setpoint,n}$ where n=n+1=3. Accordingly, the first incremental gas injection rate is restated as InjGas$_{setpoint,n-1}$, where n=n-1=1. If the first incremental slope is greater or equal to the SLOPE, the PLC is reset to OPT=1 and the desired second incremental gas injection rate InjGas$_{setpoint,n}$ is increased from the desired first incremental gas injection rate InjGas$_{setpoint,n-1}$ by the value Q such that:

$$InjGas_{setpoint,n}=InjGas_{setpoint,n-1}-Q.$$

If the first incremental slope$_n$ is less than the SLOPE, the PLC is reset to OPT=2, and the desired second incremental gas injection rate InjGas$_{setpoint,n}$ is decreased from the desired first incremental gas injection rate InjGas$_{setpoint,n-1}$ by the value Q such that:

$$InjGas_{setpoint,n}=InjGas_{setpoint,n-1}-Q.$$

The FCV is maintained at the second incremental position for a second incremental stabilizing time period M sufficient to stabilize production of liquid from the well at a second incremental steady state. The first and second incremental stabilizing periods M are preferably equal to one another. Production is continued from the well after period M for a predetermined second incremental steady-state time period x, while maintaining the FCV set at the second incremental position and injecting the lift gas into the well. The first and second incremental steady-state periods x are preferably equal to one another. The gas injection meter measures the actual second incremental injection rate of the lift gas $InjGas_n$ from the FCV into the well and transmits the rate measurements to the PLC as feedback. The PLC compares the actual second incremental gas injection rate $InjGas_n$ and the desired second incremental gas injection rate $InjGas_{setpoint,n}$ to insure that the actual second incremental gas injection rate $InjGas_n$ closely approximates the desired second incremental gas injection rate $InjGas_{setpoint,n}$ within bounds UBND and LBND.

A second incremental volume of liquid is displaced from the well during time x while the lift gas is continuously injected into the well at the actual second incremental gas injection rate $InjGas_n$. The liquid is conveyed to the liquid flow meter where the relative volume of each liquid component, and correspondingly the second incremental liquid production rate $BLPD_n$, i.e., $(BOPD_n+BWPD_n)$, is measured and transmitted to the PLC as feedback. The rates $BLPD_n$, $InjGas_n$ and $InjGas_{setpoint,n}$ are stored in the PLC memory.

At the end of time x, the PLC determines a measured gas-lift slope of the incremental liquid production rate change versus the incremental gas injection rate change for the well from the values of $BLPD_n$, $BLPD_{n-1}$, $InjGas_n$ and $InjGas_{n-1}$ stored in the PLC memory. This measured gas-lift slope is termed the second incremental slope, $slope_n$, wherein:

$$slope_n = \frac{(BLPD_n - BLPD_{n-1})}{(InjGas_n - InjGas_{n-1})}$$

The PLC compares the second incremental slope to the SLOPE stored in the PLC memory. If the second incremental slope is greater than or equal to the SLOPE and OPT=2, or if the second incremental slope is less than the SLOPE and OPT=1, the minimum positive value of the slope corresponds to the first incremental $slope_n$ and the desired first incremental gas injection rate $InjGas_{setpoint,n-1}$ is determined to be the economic optimum gas injection rate $InjGas_{setpoint,optimum}$. Accordingly, the PLC automatically resets and maintains the FCV at the first incremental position, enabling continuous injection of the lift gas into the well at the actual first incremental gas injection rate $InjGas_{n-1}$ and enabling economically optimized continuous production of oil from the well. As such, the PLC automatically terminates the optimization routine which has been completed upon determination of the economic optimum gas injection rate.

Alternatively, if the second incremental slope is greater than or equal to the SLOPE and OPT=1, or if the second incremental slope is less than the SLOPE and OPT=2, then the optimization routine is continued, repeating the above-recited steps at additional incremental gas injection rates $InjGas_n$ differing by increments of Q until an economic optimum gas injection rate $InjGas_{setpoint,optimum}$ is determined in the above-recited manner.

It is noted that the present method has been described above, wherein the first incremental value is selected as a positive value. Accordingly, the second incremental value is selected as a positive value, if the first incremental slope is greater than or equal to the optimum gas-lift slope. Conversely, the second incremental value is selected as negative, if the first incremental slope is less than the optimum gas-lift slope. Although this is a preferred embodiment, it is apparent to the skilled artisan that it is within the scope of the present invention to select the first incremental value as a negative value and proceed in substantially the same manner as described above.

While the foregoing preferred embodiments of the invention have been described and shown, it is understood that alternatives and modifications, such as those suggested and others, may be made thereto and fall within the scope of the present invention.

We claim:

1. A method for determining an optimum gas injection rate for a gas-lifted oil well penetrating a subterranean oil-bearing formation comprising:
   a) providing an optimum gas-lift slope for a gas-lifted oil well;
   b) injecting a lift gas into said well at an initial gas injection rate to displace liquid from said well at an initial liquid production rate;
   c) injecting said lift gas into said well at a first incremental gas injection rate differing from said initial gas injection rate by a first incremental value to displace liquid from said well at a first incremental liquid production rate;
   d) calculating a first incremental slope from said initial liquid production rate, said first incremental liquid production rate, said initial gas injection rate and said first incremental gas injection rate;
   e) comparing said first incremental slope to said optimum gas-lift slope;
   f) injecting said lift gas into said well at a second incremental gas injection rate differing from said first incremental gas injection rate by a second incremental value to displace liquid from said well at a second liquid production rate, wherein said second incremental value is selected as either positive or negative in response to comparing said first incremental slope and said optimum gas-lift slope;
   g) calculating a second incremental slope from said first incremental liquid production rate, said second incremental liquid production rate, said first incremental gas injection rate and said second incremental gas injection rate;
   h) comparing said second incremental slope to said optimum gas-lift slope; and
   i) determining said first incremental gas injection rate to be said optimum gas injection rate or repeating steps f), g) and h) for a third incremental gas injection rate in response to comparing said second incremental slope and said optimum gas-lift slope.

2. The method of claim 1 wherein said first incremental value is positive.

3. The method of claim 1 wherein said first incremental value is negative.

4. The method of claim 1 wherein said second incremental value is selected positive if said first incremental slope is greater than or equal to said optimum gas-lift slope.

5. The method of claim 1 wherein said second incremental value is selected negative if said first incremental slope is less than said optimum gas-lift slope.

6. The method of claim 4 wherein said first incremental gas injection rate is determined to be said optimum gas injection rate if said second incremental slope is less than said optimum gas-lift slope.

7. The method of claim 4 wherein steps f), g) and h) are repeated for said third incremental gas injection rate if said second incremental slope is greater than or equal to said optimum gas-lift slope.

8. The method of claim 5 wherein said first incremental gas injection rate is determined to be said optimum gas injection rate if said second incremental slope is greater than or equal to said optimum gas-lift slope.

9. The method of claim 5 wherein steps f), g) and h) are repeated for said third incremental gas injection rate if said second incremental slope is less than said optimum gas-lift slope.

10. The method of claim 1 wherein said optimum gas-lift slope is calculated from predetermined data including well production revenue data and well operating cost data.

11. The method of claim 1 wherein said optimum gas-lift slope is a minimum positive value of an incremental slope.

12. The method of claim 1 wherein said initial gas injection rate is maintained for an initial stabilizing time period sufficient to stabilize production from said well at steady state.

13. The method of claim 12 further comprising measuring an initial volume of liquid displaced from said well during an initial steady-state time period after said initial stabilizing time period to determine said initial liquid production rate.

14. The method of claim 13 wherein said first incremental gas injection rate is maintained for a first incremental stabilizing time period sufficient to stabilize production from said well at steady state.

15. The method of claim 14 further comprising measuring a first incremental volume of liquid displaced from said well during a first incremental steady-state time period after said fast incremental stabilizing time period to determine said first incremental liquid production rate.

16. The method of claim 15 wherein said first incremental steady-state time period is substantially equal to said initial steady-state time period.

17. The method of claim 1 wherein the absolute value of said first incremental value is substantially equal to the absolute value of said second incremental value.

18. The method of claim 1 further comprising repeating step i) for additional incremental gas injection rates until an incremental gas injection rate is determined to be said optimum gas injection rate.

19. The method of claim 1 wherein said liquid production rates are the rates at which total liquids are produced from said well.

20. The method of claim 1 wherein said liquid production rates are the rates at which oil is produced from said well.

21. A method for determining an optimum gas injection rate for a gas-lifted oil well penetrating a subterranean oil-bearing formation comprising:

a) providing an optimum gas-lift slope for a gas-lifted oil well;

b) injecting a lift gas into said well at an initial gas injection rate to displace liquid from said well at an initial liquid production rate;

c) injecting said lift gas into said well at a first incremental gas injection rate differing from said initial gas injection rate by a first incremental value to displace liquid from said well at a first incremental liquid production rate;

d) calculating a first incremental slope from said initial liquid production rate, said first incremental liquid production rate, said initial gas injection rate and said first incremental gas injection rate;

e) comparing said first incremental slope to said optimum gas-lift slope; and f) injecting said lift gas into said well at a second incremental gas injection rate differing from said first incremental gas injection rate by a second incremental value to displace liquid from said well at a second liquid production rate, wherein said second incremental value is selected positive if said first incremental slope is greater than or equal to said optimum gas-lift slope and said second incremental value is selected negative if said first incremental slope is less than said optimum gas-lift slope;

g) calculating a second incremental slope from said first incremental liquid production rate, said second incremental liquid production rate, said first incremental gas injection rate and said second incremental gas injection rate;

h) comparing said second incremental slope to said optimum gas-lift slope; and i) determining said first incremental gas injection rate to be said optimum gas injection rate if said second incremental slope is less than said optimum gas-lift slope and said second incremental value is positive or if said second incremental slope is greater than or equal to said optimum gas-lift slope and said second incremental value is negative, and repeating steps f), g) and h) for a third incremental gas injection rate if said second incremental slope is greater than or equal to said optimum gas-lift slope and said second incremental value is positive or if said second incremental slope is less than said optimum gas-lift slope and said second incremental value is negative.

22. The method of claim 21 wherein the absolute value of said first incremental value is substantially equal to the absolute value of said second incremental value.

23. The method of claim 21 further comprising repeating step i) for additional incremental gas injection rates until an incremental gas injection rate is determined to be said optimum gas injection rate.

24. The method of claim 21 wherein said liquid production rates are the rates at which total liquids are produced from said well.

25. The method of claim 21 wherein said liquid production rates are the rates at which oil is produced from said well.

26. The method of claim 21 wherein said first incremental value is positive.

27. The method of claim 21 wherein said first incremental value is negative.

* * * * *